US006209893B1

United States Patent
Ferris

(10) Patent No.: US 6,209,893 B1
(45) Date of Patent: Apr. 3, 2001

(54) MOBILE SUPPORT DEVICE FOR CONCRETE SPREADING HOSES

(76) Inventor: Wakyn Steven Ferris, 4997 E. Iowa Ave., Denver, CO (US) 80222

( * ) Notice: Subject to any disclaimer, the term of this patent is extended or adjusted under 35 U.S.C. 154(b) by 0 days.

(21) Appl. No.: 09/340,607

(22) Filed: Jun. 28, 1999

(51) Int. Cl.[7] .................................................. B62B 1/00
(52) U.S. Cl. .................................. 280/47.131; 280/79.6; 248/75; 239/726
(58) Field of Search ........................... 280/47.131, 79.6, 280/79.4, 31, 32, 47.24, 47.26, 47.34, 47.36, 87.021, 63; 410/47, 48, 49, 50, 51; 169/25; 248/75, 80, 82, 92; 239/726

(56) References Cited

U.S. PATENT DOCUMENTS

| | | | | |
|---|---|---|---|---|
| 176,732 | * | 5/1876 | Altick | 280/47.131 |
| 664,240 | * | 12/1900 | Doehring | 280/47.131 |
| 2,536,561 | * | 1/1951 | Mickam . | |
| 3,508,503 | * | 4/1970 | Daly . | |
| 3,662,579 | * | 5/1972 | Lewis . | |
| 4,116,716 | * | 9/1978 | Itoh et al. . | |
| 4,535,924 | * | 8/1985 | Quinn . | |
| 5,219,175 | * | 6/1993 | Woelfel | 280/47.131 |
| 5,727,778 | * | 3/1998 | Nodar . | |
| 6,019,360 | * | 2/2000 | Rice . | |

FOREIGN PATENT DOCUMENTS

673882 * 12/1978 (CH) .
273103 * 10/1993 (JP) .

* cited by examiner

Primary Examiner—Brian L. Johnson
Assistant Examiner—Bryan Fischmann
(74) Attorney, Agent, or Firm—Herman H. Bains

(57) ABSTRACT

A mobile support device for supporting a concrete spreading hose includes a truncated V-shaped support having a horizontal web position and upwardly diverging legs. Castor wheel assemblies support the V-shaped support for travel over a surface. A hold down mechanism is pivoted to one of the legs and is engaged by a keeper element releasibly locked by a locking element on the other leg. The hold down mechanism clamps and confines a concrete spreading hose seated in the truncated V-shaped support. The concrete spreading hose is secured against movement relative to the support even when subjected to pumping surges.

4 Claims, 1 Drawing Sheet

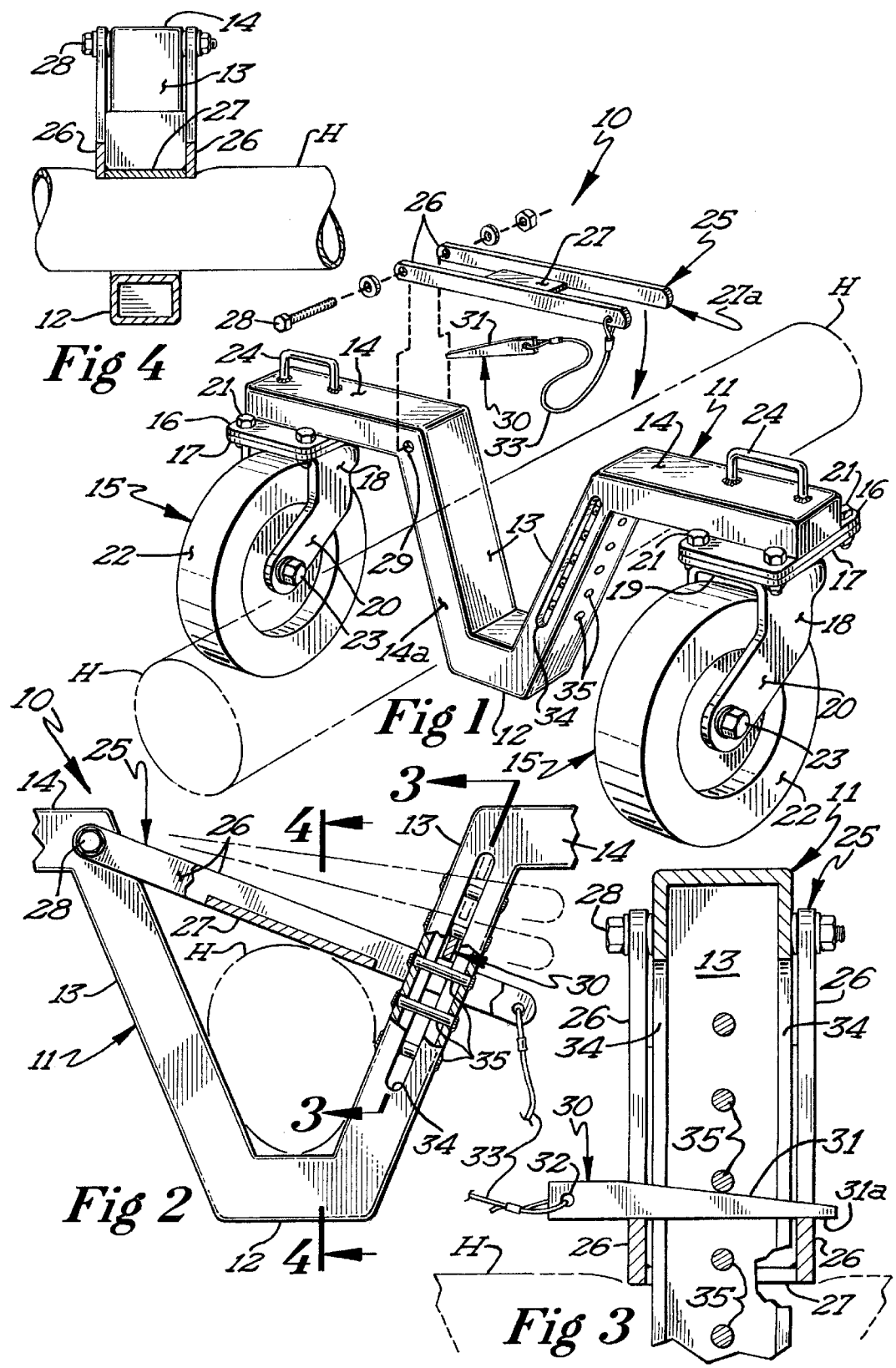

MOBILE SUPPORT DEVICE FOR CONCRETE SPREADING HOSES

FIELD OF THE INVENTION

This invention relates to a mobile support device for supporting and moving concrete spreading hoses.

BACKGROUND OF THE INVENTION

In the construction industry, especially involving the construction of buildings, concrete used in such constructions is transported via heavy duty hoses, The concrete is pumped from a source to a site where the concrete is discharged and spread. The viscous concrete may be moved vertically upwardly or downwardly several floors to the selected site.

Delivery hoses vary in size, from about three to six inches in diameter, but are extremely heavy when filled with viscous concrete. For example, a ten foot length or hose having a diameter of five inches weighs approximately two hundred pounds.

U.S. Pat. No. 5,219,175 discloses a mobile support for delivery hoses for concrete, but this support device has certain shortcomings. The hose support structure disclosed in U.S. Pat. No. 5,219,175 ('175 Patent) is of U-shaped configuration having a curved bottom and substantially parallel sides. A keeper located at the upper surface of the U-shaped support in the '175 Patent retains the delivery hose against accidentally displacement from the support. However, the keeper in the '175 Patent does not engage the delivery hose and the hose is free to move within the support.

Concrete delivery hoses are subjected to pumping surges which causes them to react, sometimes violently, to such pumping surges. If the delivery hose is not tightly and securely clamped in a support, then the reaction effect of the hose to pumping surges is similar to a high pressure fire hose. The '175 Patent does not tightly clamp the hose to the support.

SUMMARY OF THE INVENTION

It is an object of this invention to provide an improved mobile support for distributor hoses used to spread concrete.

A more specific object of this invention V-shaped configuration having an adjustable hold-down device for snugly confining a concrete delivery hose.

BRIEF DESCRIPTION OF THE FIGURES OF THE DRAWINGS

FIG. 1 is a perspective view, partially exploded, of the improved mobile support device for concrete spreading hoses.

FIG. 2 is a fragmentary elevational view of the truncated V-shaped support illustrating the hold-down mechanism in one hose engaging position in full line configuration and illustrating the hold-down mechanism in other positions by dotted line configuration.

FIG. 3 is a cross-sectional view taken approximately along line 3—3 of FIG. 2 and looking in the direction of the arrows; and FIG. 4 is a cross-sectional view taken approximately along line 4—4 of FIG. 2 and looking in the direction of the arrows.

DESCRIPTION OF THE PREFERRED EMBODIMENT

Referring now to the drawings, and more particularly to FIG. 1, it will be seen that one embodiment of the improved mobile support device, designated generally by the reference numeral 10, for supporting concrete spreading hoses, is thereshown. The mobile support device includes a truncated V-shaped support 11 including a web portion 12 having a pair of legs 13 integral therewith and diverging upwardly therefrom. The legs 13 have castor wheel mounting members 14 integral with the upper ends thereof and extending outwardly therefrom.

The truncated V-shaped support and castor wheel supports are tubular construction formed of metal, preferably steel, and of rectangular cross-sectional configuration. It will be noted that the web portion 12 is horizontally disposed and is disposed in parallel relation with respect to the castor wheel mounting members 14.

Each castor wheel mounting member 14 has a flat substantially rectangular mounting plate 16 welded to the lower surface adjacent the outer end thereof. A castor wheel assembly 15 is attached to each mounting plate 16. Each castor wheel assembly includes an attachment slate 17 of flat rectangular configuration and substantially identical in shape and size to a mounting plate 16. A U-shaped yoke 18 is pivotally connected to plate 17 and includes a web portion 19 having a pair of legs 20 integrally formed therewith and depending therefrom. The plate 17 is rigidly secured to plate 16 by suitable nut and bolt assemblies 21.

Each castor wheel assembly includes a castor wheel 22 rotatably secured to the legs of yoke 18 by an axle 23. Each castor wheel is connected via the pivotal connection (not shown) between the web portion 19 and plate 17 for pivotal movement about a vertical axis. Since each castor wheel has the conventional offset construction, it will castor in the conventional manner. U-shaped handles 24 are secured to the upper surface of the castor wheel mounting members 14 as shown in FIG. 1.

Means are provided for engaging and holding the hose in snugly confined relation within the truncated V-shaped support 11. This hold down means 25 includes an H-shaped locking member 27a including a pair of elongate, substantially straight locking bars 26 rigidly interconnected intermediate their respective ends by a flat, generally rectangular, hose engaging plate 27. The adjacent ends of the bars 26 are pivotally connected to one of legs 13 at its juncture with a castor wheel mounting member 14 by a pivot comprised of a nut and bolt assembly 28. The bolt of the nut and bolt assembly projects through an opening 29 in one of the legs 13. It will be seen that the H-shaped locking member 27a is vertically swingable about a horizontal transverse axis.

One of the bars 26 has an opening in the non-pivoted end for accommodating one end of an elongate flexible member therein and which is secured thereto. The other end of the flexible retaining member has an elongate locking pin 30 secured thereto.

The locking pin 30 has a straight longitudinal edge 31a and an inclined longitudinal edge 31. One of the legs 13 has a pair of aligned registering slots 34 in opposed surfaces 14a therein. It will be noted that the slots 34 extend throughout a major portion of the length of the associated leg 13.

The leg 13 having slots 34 therein also has a plurality vertically spaced apart locking elements 35 extending therethrough and attached thereto. In the embodiment shown, the locking elements extend transversely of the elongate slots 34. With this arrangement, the locking pin 30 may be inserted through the slots 34 such that the inclined surface 31 engages one of the locking elements 35 and the hose H engaging plate 27 engages a hose seated against the web portion 12. This is clearly illustrated in FIGS. 2 and 3. It will further be noted that the inclined surface or edge 31 allows the locking pin 30 to be cammed or wedged against a selected locking element 35 while the lower straight edge 31 engages the upper surface of the bars 26. One end of an elongate flexible member 33 extends through an opening and is secured to one of the bars 26 of the hold down means 25. The other end of the flexible member 33 extends through an opening 32 of the locking pin 30 and is secured thereto thereby securing the locking pin 30 to the hold down means 25.

The locking mechanism 27a serves to retain a hose is snugly confined relation within the truncated V-shaped support 11 and thereby prevent movement from pumping surges through the hose.

From the foregoing, it will be seen that an improved mobile support device has been provided for supporting and confining concrete spreading hoses for movement and manipulation at a construction work site.

What is claimed is:

1. A mobile support device for supporting a concrete spreading hose at a construction site, comprising a truncated V-shaped hose support formed of rigid tubular material of rectangular cross-sectional configuration, said support including a flat, normally horizontal web portion having a pair of legs diverging upwardly therefrom to define a hose-receiving recess, such that hoses of different diametrical sizes will be snugly seated in the recess, a pair of elongate castor wheel support members each being integral with the upper end of a leg and extending outwardly therefrom in substantially parallel relation with the web portion, a pair of castor wheels assemblies each including a castor wheel, pivot means pivotally connecting each castor wheel with one of said support members for pivoting movement of the castor wheel about a vertical axis, a hose engaging hold down mechanism pivotally mounted on the hose support for pivotal movement between hose-engaging and release positions, said hold down mechanism including an hold down structure having one end thereof pivotally connected to one leg of the V-shaped support for vertical swinging movement relative thereto, a plurality of vertically spaced apart locking elements on the other leg of said V-shaped support, and an elongate keeper element engaging said locking elements and said hold down structure for retaining said hold down structure in clamping and confining relation with a concrete spreading hose seated in said truncated V-shaped support.

2. The mobile support as defined in claim 1 wherein said hold down structure is of H-shaped configuration including a flat hose-engaging portion.

3. The mobile support as defined in claim 1 wherein said other leg has opposed elongate vertically extending slots therein, said locking elements comprising a plurality of locking pins extending transversely of the direction of said slots.

4. The mobile support device as defined in claim 3 wherein said keeper element is of wedge shaped configuration and is progressively cammed against the hold down structure to force the latter against the concrete spreading hose when the hold down mechanism is in the locking position.

* * * * *